United States Patent [19]
Laslo et al.

[11] 4,198,387
[45] Apr. 15, 1980

[54] MAINTAINING THE SELECTIVE REMOVAL OF H$_2$S FROM A VARIABLY FLOWING GAS STREAM CONTAINING H$_2$S AND CO$_2$

[75] Inventors: Joseph A. Laslo; John K. Laberteaux, both of Bethlehem, Pa.

[73] Assignee: Bethlehem Steel Corporation, Bethlehem, Pa.

[21] Appl. No.: 877,636

[22] Filed: Feb. 14, 1978

[51] Int. Cl.$^2$ .................... C01B 17/04; B01D 53/34
[52] U.S. Cl. ........................... 423/574 R; 423/210; 423/228; 55/224; 55/226; 261/23 R; 261/55; 261/63; 422/170; 422/189
[58] Field of Search ............ 423/210, 220, 659, 573.6, 423/222–224, 573 R, 574 L, 226–228, 574 R, 232–234, 229; 55/30, 31, 63, 224, 68, 73, 180, 226–228; 261/21–23 R, 45, 46, 54, 55, 63, 146–148; 23/261, 283, 284, 288 E; 422/169, 170, 188, 189, 900, 423

[56] References Cited
U.S. PATENT DOCUMENTS

| | | | |
|---|---|---|---|
| 420,751 | 2/1890 | Walker | 261/23 R |
| 903,832 | 11/1908 | Black et al. | 261/63 |
| 929,358 | 7/1909 | Wilton | 261/23 R |
| 1,892,428 | 12/1932 | Fonda | 55/19 |
| 1,925,198 | 9/1933 | Melville | 423/222 |
| 1,962,525 | 6/1934 | Richardson | 423/210 |
| 3,266,866 | 8/1966 | Bally et al. | 423/226 |
| 3,333,398 | 8/1967 | Schneider | 55/224 X |
| 3,823,222 | 7/1974 | Benson | 423/226 |
| 3,859,414 | 1/1975 | Urban | 423/222 |
| 3,890,120 | 6/1975 | Guyot et al. | 55/62 |
| 3,934,012 | 1/1976 | Schievelbein | 423/232 |
| 3,965,244 | 6/1976 | Sykes, Jr. | 423/228 |
| 3,989,811 | 11/1976 | Hill | 423/573.6 |
| 4,024,208 | 5/1977 | Wetteborn | 423/210 X |
| 4,047,904 | 9/1977 | Worrall | 55/18 |
| 4,059,421 | 11/1977 | Kurata et al. | 55/196 |
| 4,085,192 | 4/1978 | Van Scoy | 423/226 |
| 4,085,199 | 4/1978 | Singleton et al. | 423/574 R |

FOREIGN PATENT DOCUMENTS 781513  8/1957  United Kingdom ............ 261/21

*Primary Examiner*—Earl C. Thomas
*Attorney, Agent, or Firm*—Joseph J. O'Keefe; Charles A. Wilkinson; Michael Leach

[57] ABSTRACT

A method and apparatus for selectively removing H$_2$S from a gas stream containing H$_2$S and CO$_2$ and having a variable flow rate. The absorption system is divided into at least two absorption columns which are connected in parallel and contain at least two individual absorption volumes connected in series in which the gas and absorbent solution can countercurrently contact each other. The absorption system has means to control the passage of the fluid streams to each absorption column and the absorbent solution through the individual absorption volumes.

6 Claims, 3 Drawing Figures

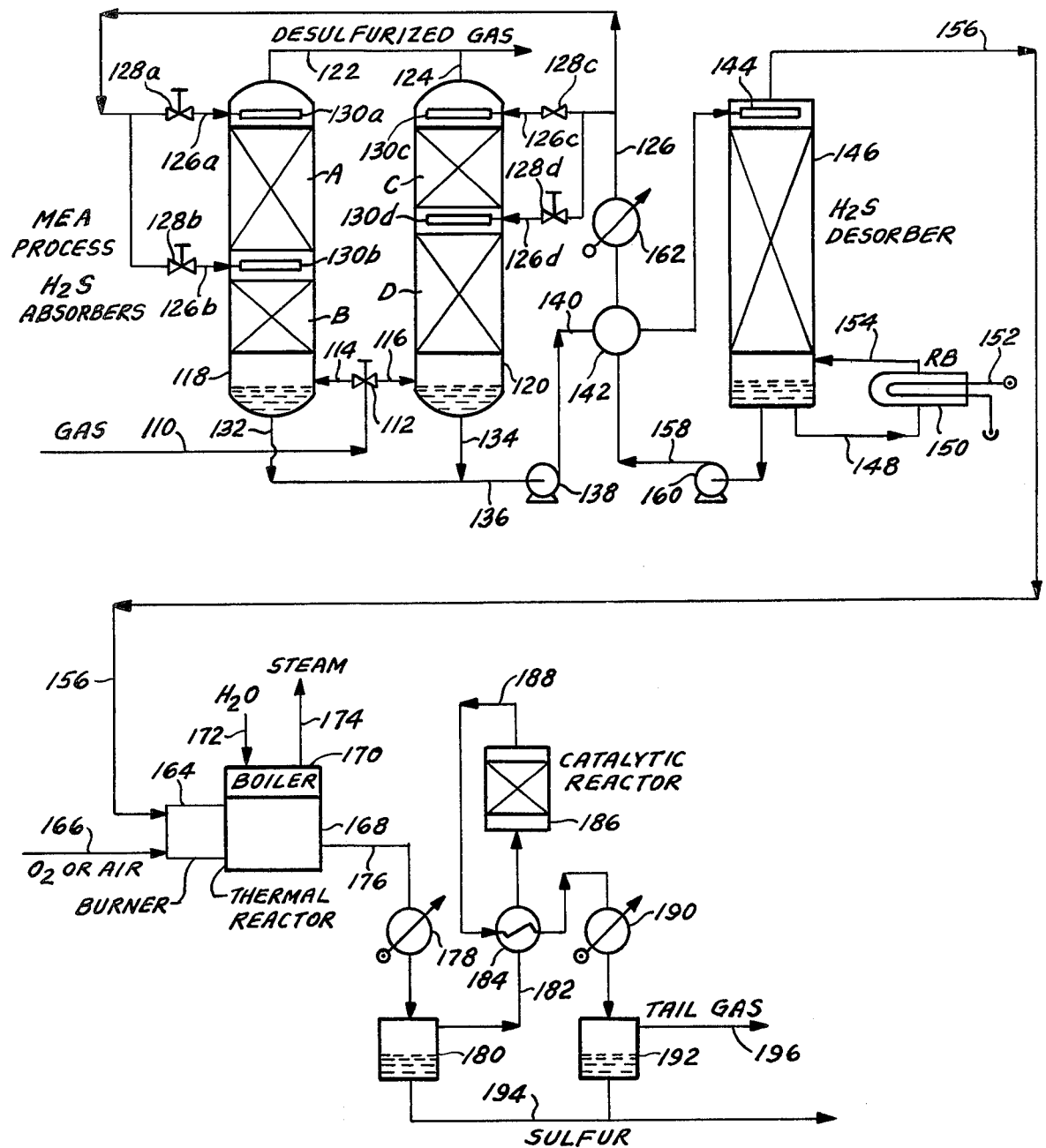

MAINTAINING THE SELECTIVE REMOVAL OF H₂S FROM A VARIABLY FLOWING GAS STREAM CONTAINING H₂S AND CO₂

CROSS-REFERENCES TO RELATED APPLICATIONS

Related applications are titled "Selective Removal of a Gaseous Component from a Multi-Component Gas Stream" Ser. No. 877,634 filed by J. A. Laslo, M. O. Tarhan, C. W. Sheldrake and D. Kwasnoski and "Selective Removal of H₂S from an H₂S and CO₂ Containing Gas Stream" Ser. No. 877,639 filed by J. A. Laslo and D. Kwasnoski.

FIELD OF THE INVENTION

The method and apparatus of this invention relate to the selective removal of a gaseous component from a gas stream. More particularly, this invention relates to the selective removal of $H_2S$ from a gas stream containing $H_2S$ and $CO_2$ and having a variable flow rate.

BACKGROUND OF THE INVENTION

Selectively removing $H_2S$ from a gas stream containing $H_2S$ and $CO_2$ is a process common to many industries such as the coke-making, the petroleum and the natural gas industries. Of the several techniques employed one utilizes the selective absorption of $H_2S$ into a wide variety of liquid absorbent solutions which can then be regenerated to afford a concentrated $H_2S$ gas stream for further processing in a sulfur recovery system. In this type of process aqueous alkanolamines are the most widely used absorbent solution. The $H_2S$ and $CO_2$ containing gas stream, such as coke oven gas, is usually treated with the alkanolamine solution in any suitable absorption apparatus such as a packed bed absorber, a spray contact apparatus, a bubble-cap tray absorber and the like. The $H_2S$ will react almost instantaneously with the aqueous alkanolamine solution to form alkanolammonium sulfide or hydrosulfide which may then be decomposed by the application of heat to the solution to strip the $H_2S$ from the absorbent solution, for example by the use of steam in a desorption stage.

Carbon dioxide, on the other hand, takes a significantly finite time to react with the water in the alkanolamine solution to form carbonic acid according to the well-known equilibrium reaction prior to reacting with the alkanolamine to form alkanolammonium carbonate or bicarbonate. Thus the $CO_2$ does not tend to be taken up by the alkanolamine solution as readily, and is consequently not removed from the gas stream as quickly as the $H_2S$. In general, it may be simplistically stated that the molar ratio of $H_2S$ to $CO_2$ absorbed in the absorbent solution will depend principally upon the gas-liquid contact volume and the gas residence time in this absorption volume. Since $H_2S$ has a much greater rate of absorption into an alkaline absorbent than does $CO_2$ and if the absorption is conducted under non-equilibrium conditions in a manner such that the gas stream is only in contact with the absorbent solution for a relatively short period of time (i.e., relative to the time for an equilibrium condition to be established), then some selectivity for $H_2S$ can be obtained if larger amounts of $H_2S$ can be tolerated in the treated gas stream than would otherwise be present with a longer contact time. So long as the flow rate of the gas to the absorber is relatively constant and is significantly greater than the time required to absorb all of the $CO_2$ into the solution, the ratio of $H_2S$ to $CO_2$ absorbed will tend to remain substantially constant. The unabsorbed $CO_2$ leaves the absorption apparatus along with any other unabsorbed gases which may be present as the exhausted desulfurized gas.

Subsequent to the absorber is the desorption apparatus which thermally drives the absorbed gases out of the absorbent solution to yield regenerated absorbent for recycling to the absorber and an $H_2S$ and $CO_2$ containing desorbed acid gas stream which is directed to a sulfur recovery plant, such as a Claus plant.

The major problem of the above described $H_2S$ removal and sulfur recovery system is the limited flexibility of the process. When the feed gas flow rate decreases in a given absorption system, the contact or residence time of the gas in the absorbent solution immediately increases with consequent lowering of the selectivity because the absorption process moves in the direction of equilibrium conditions for the absorption of $CO_2$ and results in a decreasing $H_2S:CO_2$ absorption ratio.

Upon desorption, the increased $CO_2$ content of the desorbed gas stream may reach such a concentration that it will not support the combustion of the $H_2S$ in the sulfur recovery plant which then becomes inoperative.

One solution to this problem of inflexibility is offered in a copending application Ser. No. 877,639 titled "Selective Removal of $H_2S$ from an $H_2S$ and $CO_2$ Containing Gas Stream" by J. A. Laslo, and D. Kwasnoski, filed concurrently with and assigned to the assignee of this application. Laslo and Kwasnoski disclose that the $H_2S$ concentration of the desorbed acid gas stream relative to the $CO_2$ concentration can be maintained above the $H_2S:CO_2$ ratio at which the downstream Claus type sulfur recovery system becomes inoperative when the flow rate of the $H_2S$ and $CO_2$ containing feed gas stream decreases by contacting the feed gas with the absorbent solution in a smaller absorption volume. This smaller absorption volume is sized to be a percentage of the original absorption volume which is within a percentage point range of the decreased gas flow rate at which the sulfur recovery system becomes inoperative or at which the switch to the smaller absorption volume is made, expressed as a percentage of the maximum gas flow rate. By performing the gas-liquid contact in a smaller volume the reduced gas flow will have a lesser residence time in this smaller absorption volume than it would have in the original absorption volume which is dimensioned to treat the maximum gas flow. The lesser residence time means a higher $H_2S:CO_2$ ratio in the absorbent solution.

A solution to the broader problem of selectively removing a desired gaseous component from a variably flowing gas stream by absorption into a liquid absorbent solution which will absorb at least one additional less desired gaseous component from the gas stream at a different absorption rate is disclosed by J. A. Laslo, M. O. Tarhan, C. W. Sheldrake and D. Kwasnoski in a copending application Ser. No. 877,634 titled "Selective Removal of a Gaseous Component from a Multi-Component Gas Stream" filed concurrently with, and assigned to the assignee of, this application. Laslo et al. pass the two fluid streams countercurrently through a total absorption volume which comprises at least two individual absorption volumes connected in series. The passage of one of the fluid streams can be regulated through the individual absorption volumes in such a manner as to effectively add or subtract individual absorption volumes in which gas-liquid contact occurs in response to the variations in the gas flow rate thus achieving a more constant residence time. A more constant residence time means the absorbent solution will contain dissolved in it a ratio of desired component to less desired component which is more nearly like that ratio for which the absorption system was designed.

Laslo et al. show that good flexibility and turndown can be achieved by having a plurality of individual absorption volumes compose the total absorption volume. Sequentially adding or subtracting individual absorption volumes in the series in a cumulative manner can be accomplished rather easily. There is, however, a problem with incorporating or removing individual absorption volumes in a non-sequential cumulative manner from the middle of the connected series. While it can be accomplished with a plurality of individual volumes serially connected in one absorption volume, the valves, piping and hardware necessary render such an embodiment unattractive.

Accordingly, there is a need in a total absorption volume comprising individual absorption volumes to have the capability of adding or removing individual absorption volumes in a non-sequential manner. Particularly, there is a need to provide a total absorption volume having the increased flexibility to treat a variable gas flow more efficiently and economically by using the maximum possible absorption capacity of a selected combination of individual absorption volumes where the combination may be one other than a solely sequential series. More particularly, there is a need for an $H_2S$ absorber that changes its absorption volume capacity in response to the varying flow rate of an $H_2S$ and $CO_2$ containing gas stream to maximize the $H_2S$ content of the desorbed acid gas and thus optimize the operation of the sulfur recovery plant.

SUMMARY OF THE INVENTION

The aforementioned difficulties in selectively absorbing $H_2S$ from an $H_2S$ and $CO_2$ containing gas stream having a varying flow rate can be solved in accordance with the present invention. It has been found that the $H_2S$ can be selectively absorbed from an $H_2S$ and $CO_2$ containing and variably flowing gas stream into an absorbent solution that also absorbs $CO_2$ at a different rate if the absorption volume is constructed in the manner of the invention. The desired result can be obtained if the two fluid streams, that is the gas stream and the absorbent solution stream, are countercurrently contacted in a total absorption volume which is divided into at least two sets of absorption volumes. At least one set comprises a first and a second individual absorption volume while the other set may consist of a single individual absorption volume. Preferably, each set comprises a first and a second individual absorption volume. Fluid passage means conducts the fluid streams through the total absorption volume, connects the sets of absorption volumes in parallel in that the gas stream is split to feed the sets simultaneously and connects the individual absorption volumes of a set in series allowing for countercurrent flow of the fluid streams through the individual absorption volumes. Gas valve means apportions the flow of the gas streams between the sets of absorption volumes in a ratio identical to the ratio of the effective absorption capacity of the sets. "Effective absorption capacity" is defined to mean the sum of the individual absorption volumes in which gas-liquid contact is occurring. Liquid valve means determines the passing of the absorbent solution through the first and second individual absorption volumes.

Under normal conditions when the gas stream flows at the maximum rate for which the total absorption volume is dimensioned, both fluid streams will traverse all the individual absorption volumes in all of the sets of absorption volumes (i.e., the total absorption volume). The gas stream is apportioned between the sets in the same ratio that exists between the effective absorption capacities of the sets. The absorbent solution flow rate through each set of absorption volumes is the same provided the absorption volumes are similarly constructed, e.g., all are beds containing identical packing, and the effective absorption capacities are equal. It is the practice of the art to proportion the absorbent solution flow rate to the gas flow rate. When the gas stream flow rate decreases, the residence time of the gas in the absorption volumes increases because it takes longer for the gas to traverse the same volume at a lesser flow rate. Therefore, to maintain the residence time in which the gas stream contacts the liquid absorbent closer to that for which the absorption system was designed and to maintain the desired $H_2S:CO_2$ ratio in the absorbent solution, an individual absorption volume in one of the sets can be effectively removed from the gas-liquid contacting operation. The absorbent solution stream to one of the sets of absorption volumes is redirected to bypass an individual absorption volume in the set so that the set now has a lesser effective gas-liquid contact volume. The flow rate of the absorbent solution is altered in relation to the flow of the gas stream which is now proportioned between the sets of absorption volumes in a new ratio that reflects the new ratio of the effective absorption capacities of the sets. Thus the reduced gas flow is contacting the absorbent solution in a total volume which is smaller than the original total absorption volume. It follows that the residence time is less than would be the case if the reduced gas flow intimately contacted absorbent solution in all the individual absorption volumes in the total absorption volume. Accordingly, the $H_2S:CO_2$ ratio can be maintained in the absorbent solution and the resultant desorbed gas stream.

The individual absorption volumes can be of equal volumes or unequal volumes of any desired ratio. In addition, the sets of individual absorption volumes may comprise any number of individual absorption volumes and there can be any number of sets. The effective absorption capacities of the sets can therefore be the same or have any ratio desired. Thus, by the proper selection of the relative sizes of the individual absorption volumes and their number composing a set, the absorbent solution flow can be determined to effectively add or subtract, in a stepwise manner, individual absorption volumes in response to the varying feed gas flow such that the resulting contact or residence time will maintain a concentration of $H_2S:CO_2$ in the absorbent solution of a selected value or within some predetermined range. Where environmental legislation restricts the amount of $H_2S$ that will be eventually discharged into the atmosphere from the desulfurized gas stream, the total absorption volume must be able to adequately treat the maximum gas flow that can be expected. The total absorption volume must, in other words, yield a desulfurized gas stream within acceptable environmental limits.

It is preferred that the individual absorption volumes which are connected in series composing a set of absorption volumes be a series of split-bed absorbers and that a set be housed in one column. The absorption volumes may be any well-known absorption volumes such as packed beds or bubble-cap trays and the like that provide efficient and intimate gas-liquid contact.

DESCRIPTION OF THE DRAWINGS

FIG. 3 is an embodiment of apparatus for the practice of the invention as applied to an $H_2S$ removal and sulfur recovery system.

DETAILED DESCRIPTION OF THE INVENTION

The present invention increases the flexibility of selectively removing $H_2S$ from a gas stream containing $H_2S$ and $CO_2$ and having a variable flow rate by absorption into an absorbent solution which also absorbs $CO_2$ but at a different rate. The invention accomplishes this by passing the gas stream through a total absorption volume comprising at least two sets of individual absorption volumes having fluid passage means connecting the sets in parallel and connecting the individual absorption volumes composing a set in series so that the gas stream and absorbent solution can countercurrently flow through the total absorption volume. As the flow rate of the gas stream varies, the liquid valve means are adjusted to redirect the flow of the absorbent solution to incorporate additional individual absorption volumes when the gas flow increases or to eliminate them when the gas flow decreases. The gas valve means apportions the gas stream to the sets of absorption volumes in proportion to their effective absorption capacities. Accordingly the residence time of the gas stream in contact with the absorbent solution is maintained more constant and in turn keeps the relative concentrations of $H_2S$ and $CO_2$ in the absorbent solution more consant.

Figure 1:
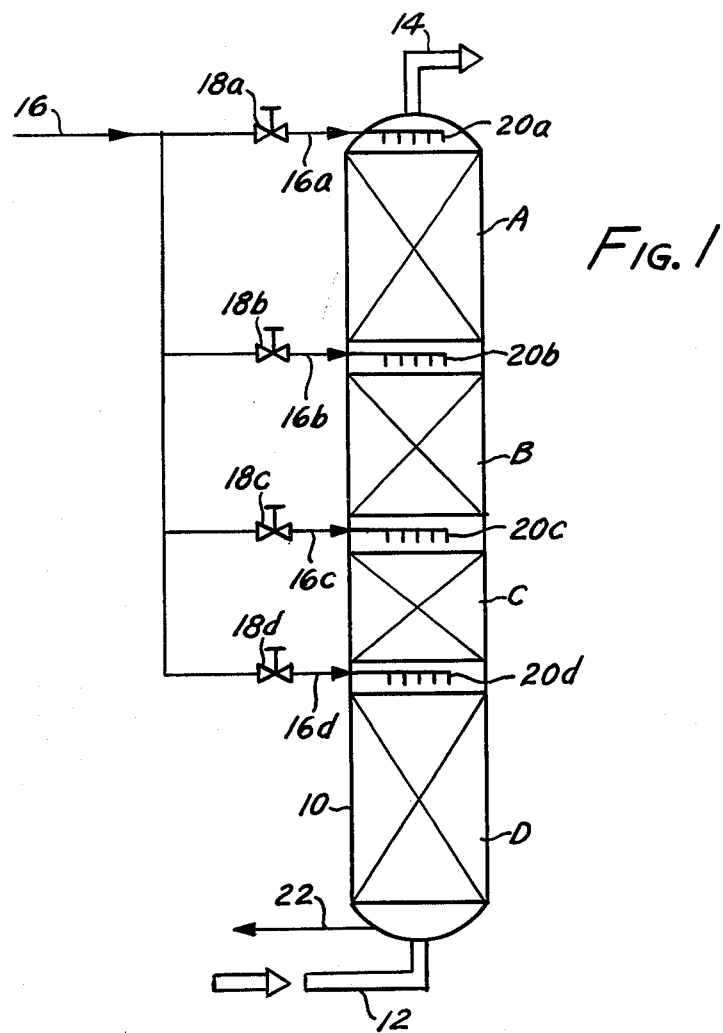
FIG. 1 is an example of a split-bed absorber.

In FIG. 1 absorption column 10 contains a total absorption volume divided into four individual absorption volumes A, B, C and D. The individual absorption volumes are segregated but are connected in series to allow the free countercurrent flow of a gas stream and an absorbent solution through them. Gas inlet line 12 introduces the gas stream into the bottom of absorption column 10 below individual absorption volume D. Gas exit line 14 leaves the top of the absorption column above absorption volume A. Absorbent solution line 16 which carries regenerated or lean absorbent solution splits into lines 16a, 16b, 16c and 16d containing valves 18a, 18b, 18c and 18d respectively, prior to entering absorption column 10 and connecting with liquid distributors 20a, 20b, 20c and 20d respectively. Line 22 carries loaded or rich absorbent solution from the bottom of absorption column 10.

The gas stream enters gas inlet line 12 into absorption column 10 below individual absorption volume D. The gas ascends through individual absorption volumes D, C, B and A, in that order, to exit via gas exit line 14. When the gas flow is at or near its maximum, the absorbent solution passes through line 16, into line 16a via valve 18a which is open and into liquid distributor 20a to be spread throughout individual absorption volume A. Valves 18b, 18c and 18d are closed to prevent any absorbent solution from entering the absorption column at another location. Thus, the absorbent solution descends through the individual volumes A, B, C, and then D to intimately contact the ascending gas stream. After gas-liquid contact is accomplished in the total absorption volume, rich absorbent solution exits via line 22.

When the flow rate of an $H_2S$ and $CO_2$ containing gas decreases so that the rich absorbent solution no longer contains an acceptable $H_2S:CO_2$ ratio because of increased residence time, individual absorption volume A can be eliminated by closing valve 18a and opening valve 18b. The absorbent solution now flows through line 16b and liquid distributor 20b to descend through only individual absorption volumes B, C and D to contact the upwardly flowing gas stream. If the gas flow rate continues to decrease whereby the ratio of dissolved $H_2S$ and $CO_2$ is not within an acceptable range, absorption volume B and finally absorption volume C can be sequentially and cumulatively eliminated to afford an acceptable residence time for the gas stream in absorption volumes containing absorbent solution.

As can be seen the individual absorption volumes can only be eliminated in a consecutively cumulative manner from the top downward, or, if the gas stream flow rate increases, added in a reverse fashion.

Figure 2:
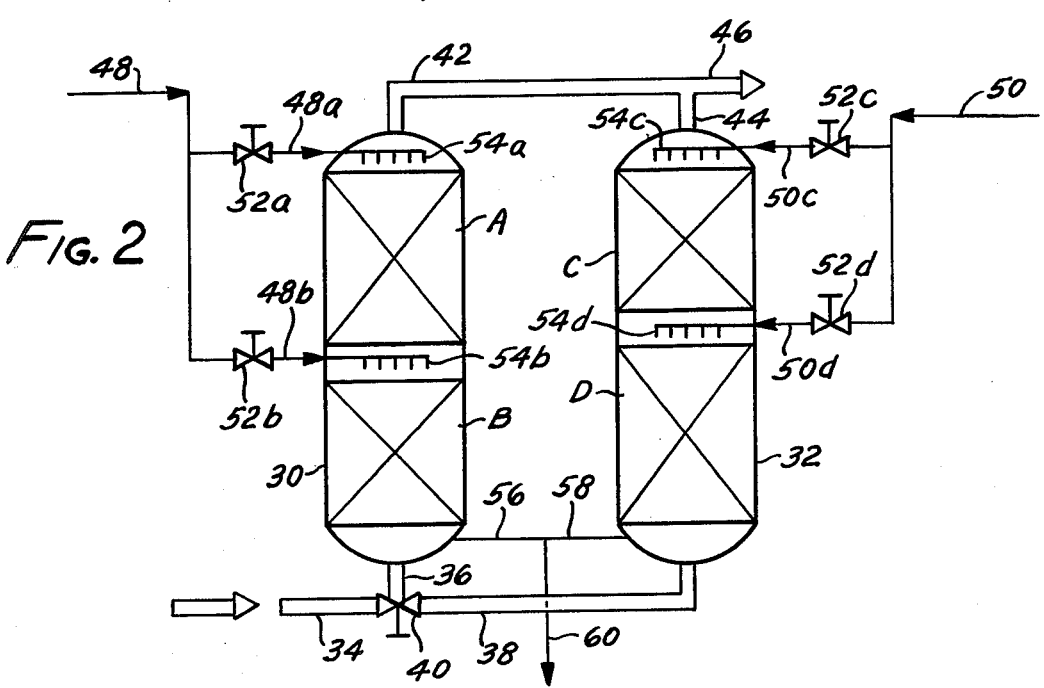
FIG. 2 is an absorption apparatus for the practice of the invention.

The absorption apparatus of FIG. 2 is an embodiment of the invention. The absorption system comprises absorption columns 30 and 32. Absorption column 30 contains individual absorption volumes A and B connected in series and absorption column 32 contains individual absorption volumes C and D connected in series. As with the individual absorption volumes of FIG. 1, the individual absorption volumes of FIG. 2 can be packed beds, bubble-cap trays or other gas-liquid contacting apparatus known in the art. Collectively individual absorption volumes A, B, C and D compose the total absorption volume of the absorption system. Absorption columns 30 and 32 can be considered the sets of individual absorption volumes.

Gas inlet line 34 splits into lines 36 and 38 which enter the bottom of columns 30 and 32 respectively. Gas valve means 40 in gas inlet line 34 can apportion the gas flow between absorption columns 30 and 32 in any chosen ratio or can close off gas flow to either column. Gas exit lines 42 and 44 emerge from the tops of absorption columns 30 and 32, respectively, to merge into gas exit line 46. Lines 42 and 44 may contain valve means to prevent back flow of gas into the columns that are shut down.

Absorbent solution line 48 which carries regenerated or lean absorbent solution splits into lines 48a and 48b containing liquid valve means 52a and 52b, respectively. Line 48a leads into absorption column 30 to connect with liquid distributor 54a situated above individual absorption volume A and line 48b enters to connect with liquid distributor 54b situated between individual absorption volumes A and B. Similarly, absorbent solution line 50 splits into lines 50c and 50d containing liquid valve means 52c and 52d, respectively. Absorbent solution lines 48 and 50 could derive from a common source. Line 50c enters absorption column 32 to connect with liquid distributor 54c located above individual absorption volume C and line 50d enters to connect with liquid distributor 54d disposed between individual absorption volumes C and D. Absorbent solution lines 48 and 50 may emanate from the same source line. Lines 56 and 58 carry loaded absorbent solution from the bottoms of absorption columns 30 and 32, respectively, and merge into line 60 which would lead to a desorption stage not shown.

The gas stream flowing in gas inlet line 34 is meted by gas valve means 40 into lines 36 and 38 and passes into columns 30 and 32. The gas in column 30 flows upwardly through individual absorption volumes B and A to exit via line 42 and merges in line 46 with the gas in line 44 which has ascended through individual absorption volumes D and C in column 32. When the gas stream is flowing at or near the maximum flow rate so that the total absorption capacity is needed, absorbent solution passes through line 48 into line 48a via opened valve means 52a and into liquid distributor 54a to be spread throughout absorption volume A of column 30. Simultaneously, absorbent solution passes through line 50 into line 50c via opened valve means 52c and into liquid distributor 54c to be spread throughout absorption volume C of column 32. Valve means 52b and 52d are closed. The absorbent solution in columns 30 and 32 descends through their respective individual absorption volumes to collect in the bottom and exit via lines 56 and 58, respectively, as loaded absorbent solution after intimtely contacting the gas stream in the total absorption volume.

When the flow rate of an $H_2S$ and $CO_2$ containing gas stream decreases so that the loaded absorbent solution emerging from the total absorption volume via line 60 contains an unacceptable $H_2S:CO_2$ ratio, an individual absorption volume can be eliminated from the effective absorption capacity of one column to yield a lesser residence time for the gas in a liquid contacting environment. Individual absorption volume A of column 30 or individual absorption volume C of column 32 can by bypassed by opening valve 52b and closing valve means 52a, or by opening valve means 52d and closing valve means 52c, respectively. The choice of which one is bypassed depends upon how much absorption volume must be eliminated to obtain a residence time for the gas that affords an acceptable concentration of $H_2S$ and $CO_2$ in the rich absorbent solution. Concomitant with the elimination of an individual absorption volume is the adjustment of gas valve means 40 to apportion the reduced gas flow between the absorption columns in a ratio identical to the new ratio of their effective absorption capacities. The practice is to proportion the absorbent solution flow rates to the gas flow rate through each absorption column.

Assuming that individual absorption volume A has been bypassed above and the gas flow rate continues to decrease, another individual absorption volume can be bypassed. Once again there is a choice between two individual absorption volumes, namely volumes B and C. In the absorption apparatus of FIG. 1 there was no choice; individual absorption volume B was next in line for bypassing. If, for example, individual absorption volume B in FIG. 2 is eliminated by closing valve means 52b so that no absorbent solution flows through line 48, gas valve means 40 is adjusted to pass all of the gas stream into absorption column 32 thus shutting down absorption column 30. A still further decrease in the gas stream flow rate would necessitate the closing of valve means 52c and opening of valve means 52d whereby absorbent solution from line 50 now flows through line 50d into liquid distributor 54d to eliminate gas-liquid contact in individual absorption volume C.

On the other hand, if individual absorption volume C had been bypassed, as described above, instead of individual absorption volume B, gas valve means 40 would be regulated to mete the gas stream between absorption columns 30 and 32 in a ratio equal to the ratio of individual absorption volume B to individual absorption volume D. With a further decrease in the gas flow rate either individual absorption volume B or individual absorption volume D is removed depending upon which remaining one affords the better residence time for the reduced gas flow. Selecting individual absorption volume D for elimination means that gas valve means 40 is regulated to pass the gas stream wholly into column 30 and valve means 52d is closed so that no absorbent solution enters absorption column 32 which is shut down.

While the absorption apparatus of FIG. 2 and its operation was described in terms of a decreasing gas flow rate requiring the removal of individual absorption volumes, it is obvious that a varying gas flow rate can be accommodated by responsively adding or removing the individual absorption volumes or combinations of them to yield the effective absorption capacity that most effeciently treats the gas flow.

Illustrative of the greater flexibility of the total absorption volume of this invention, the absorption apparatus for the practice of the invention as shown in FIG. 2 contains four individual absorption volumes yielding a greater number of effective absorption capacities than the absorption apparatus of FIG. 1 containing the same four individual absorption volumes. Absorption column 10 of FIG. 1 has four effective absorption capacities available, namely A+B+C+D (total absorption volume), B+C+D, C+D and D; whereas the absorption apparatus of FIG. 2 has eight effective absorption capacities consisting of A+B+C+D; B+C+D; A+B+D; A+B; C+D; B+D; B and D. The greater number of effective absorption capacities permits optimized operation of the absorption system to maximize the $H_2S$ content of the acid gas. Furthermore, by judicious selection of the relative sizes of the individual absorption volumes, efficient operability of the absorption system can be attained for a selected gas flow range.

For example, in Table I the total absorption volume of the absorption system can be divided into individual absorption volumes on a percent basis of A+30, B=20, C=20 and D=30. Table I shows the flexibility of such an absortion system for treating an $H_2S$ and $CO_2$ containing gas stream to generate an acid gas stream from a desorber that is directed to a Claus type sulfur recovery plant. In this example, the $H_2S$ content of the acid gas stream will be insufficient to sustain the Claus reactor operation when the gas flow rate falls below 60% of the maximum gas flow rate which the total absorption volume was designed to handle. Additionally, the combination of individual absorption volumes or the single individual absorption volumes represent effective absorption capacities each of which has an upper limit on the percentage of the maximum gas flow rate it can effectively treat, while 60% of this flow rate is the lower limit which yields an acid gas stream that renders the Claus plant inoperative.

TABLE I

| (a) Effective Absorption Capacity (E.A.C.) | (b) % of Total Absorption Volume | (c) Operating Range of E.A.C. as % of Max. Gas Flow | (d) Optimaal Operating Range of E.A.C. as % of Max. Gas Flow | (e) Optimal Operating Range as % of E.A.C. |
|---|---|---|---|---|
| A + B + C + D | 100 | 100–60 | 100–80 | 100–80 |
| A + B + D | 80 | 80–48 | 80–70 | 100–87.5 |
| B + C + D | 70 | 70–42 | 70–50 | 100–71.4 |
| A + B | 50 | 50–30 | 50–30 | 100–60 |
| C + D | 50 | 50–30 | 50–30 | 100–60 |
| B + D | 50 | 50–30 | 50–30 | 100–60 |
| D | 30 | 30–18 | 30–20 | 100–66.7 |
| B | 20 | 20–12 | 20–12 | 100–60 |

A = +  B = °
C = °  D = +

TABLE II

| (a) Effective Absorption Capacity (E.A.C.) | (b) % of Total Absorption Volume | (c) Operating Range of E.A.C. as % of Max. Gas Flow | (d) Optimal Operating Range of E.A.C. as % of Max. Gas Flow | (e) Optimal Operating Range as % of E.A.C. |
|---|---|---|---|---|
| A + B + C + D | 100 | 100–60 | 100–80 | 100–80 |
| A + B + D | 80 | 80–48 | 80–75 | 100–93.8 |
| B + C + D | 75 | 75–45 | 75–55 | 100–73.3 |
| B + D | 55 | 55–33 | 55–50 | 100–90.9 |
| A + B | 50 | 50–30 | 50–30 | 100–60 |
| C + D | 50 | 50–30 | 50–30 | 100–60 |
| D | 30 | 30–18 | 30–25 | 100–83.3 |
| B | 25 | 25–15 | 25–15 | 100–60 |

A = 25  B = 25  C = 20  D = 30

In Table I it can be seen that the effective absorption capacity comprising A+B+C+D represents the total absorption volume (100%) and can, therefore, effectively treat a gas stream having a flow rate from 100% to 60% of the maximum. Toward the lower end of this range, the subsequent desorption step becomes less efficient because the energy necessary to liberate the $H_2S$ from the loaded absorbent solution increases as the $H_2S$ concentration therein decreases. Accordingly, it is most economical to use an effective absorption capacity that is operating close to its maximum capacity to maximize the $H_2S$ content of the absorbent solution and acid gas stream. Rather than operate all four individual absorption volumes when the gas flow rate decreases below 80% of the maximum, it is preferable to bypass individual absorption volume C to have an effective absorption capacity comprising A, B and D which is 80% of the total absorption volume. Thus when this combination treats the gas stream flowing at 80% of its maximum flow rate, the combination is operating at 100% of its capacity, the most efficient condition. The A, B and D combination will maintain the downstream Claus plant operative until the flow rate of the gas stream reaches 48% of its maximum (0.60×80%). However, the combination of individual absorption volumes B+C+D (70% of total absorption volume) should preferably be used when the gas flow rate decreases to 70% of the maximum because this B+C+D combination would be more efficient operating at 100% of its effective capacity than would be combination A+B+C operating at 87.5% of its effective absorption capacity. Column (c) of Table I shows the operating range of each effective absorption capacity as a percentage of the maximum gas flow rate. Column (d) shows the optimal operating range for each effective absorption capacity as a percentage of the maximum flow rate and represents a stepwise turndown of the absorption capacity of the absorption system in which the effective absorption capacities are most efficiently utilized as illustrated in Column (e). Turndown to 12% of the maximum gas flow can be effected before the Claus plant becomes inoperative.

In Table II, as another example, the total absorption volume can be divided into individual absorption volumes on a percent basis of A=25, B=25, C=20 and D=30. Column (e) reveals that this absorption system would operate more efficiently at gas flow rates greater than 50% of maximum but with turndown capability only to 15% of maximum gas flow.

Two small individual absorption volumes as the lower individual absorption volumes of the two sets would provide good operability at less than 50% of gas flow and very effective turndown capability while two small upper individual absorption volumes would provide good operability at greater than 80% of gas flow but a lesser turndown capability. The lower individual absorption volume is that individual absorption volume which is further downstream with respect to the flow of the absorbent solution and the upper individual absorption volume.

Obviously, the relative sizes of the individual absorption volumes can be selected to yield optimal operability of the absorption system within the most prevalent gas flow range and yet handle the maximum gas flow that can be expected as well as turndown to treat a minimal gas flow. Furthermore, greater flexibility can be introduced by having absorption columns comprise different volumes, more than two absorption columns in parallel and more than two individual absorption volumes in one column.

FIG. 3 shows a preferred embodiment and process for the practice of this invention in a system for removing $H_2S$ from an industrial gas stream that also contains $CO_2$, such as coke oven gas (COG), by absorption into an alkanolaminesolution, such as monoethanolamine (MEA), and the recovery of the sulfur values as elemental sulfur. The $H_2S$ absorption columns and the $H_2S$ desorber constitute the absorption/ desorption, or desulfurization, portion of the desulfurization-sulfur recovery system. The sulfur recovery portion is the well-known Claus type reactor. Other systems for recovering sulfur from H₂S that are known in the art could also be used.

In FIG. 3 an H₂S and CO₂ containing gas stream passes through feed line 110 into gas valve 112 which apportions it into lines 114 and 116 entering absorption columns 118 and 120 respectively. The gas after entering the columns will ascend within the columns through individual absorption volumes A and B in absorption column 118 and C and D in column 120, the individual absorption volumes being connected in series in each column. The gas flows to the tops of the columns where the remaining unabsorbed gas will leave absorption columns 118 and 120 through exit lines 122 and 124, respectively, as desulfurized gas. In this instance, lines 122 and 124 merge into an exit line. Where the industrial gas stream is COG, the desulfurized gas may be utilized as a gaseous fuel in a combustion process.

When the total absorption capacity of the absorption system is used, the monoethanolamine (MEA) absorbent solution enters the top of absorption column 118 via line 126, opened valve 128a and line 126a and also enters the top of absorption column 120 via line 126, opened valve 128c and line 126c. Valves 128b and 128d are closed. From lines 126a and 126c the MEA solution is fed into liquid distributors 130a and 130c to be spread throughout the top of individual absorption volumes A and C, respectively. In column 118 the MEA solution descends through individual absorption volume A and then through individual absorption volume B to collect in the bottom of the column as rich absorbent solution after having absorbed H₂S and CO₂ during its intimate contact with the industrial gas in individual absorption volumes A and B. Likewise, the MEA solution in column 120 descends through individual absorption volumes C and D consecutively. The rich absorbent solution is withdrawn from columns 118 and 120 by lines 132 and 134, respectively, merging into line 136 and is pumped via pump 138 and line 140 through heat exchanger 142 to liquid distributor 144 in desorber 146. In the desorber the rich MEA absorbent solution is trickled downwardly through rising steam vapor. The MEA solution collects in the bottom of the desorption column and is passed through line 148 to reboiler 150 where the MEA solution is heated by steam coils 152. After being heated in the reboiler the MEA solution is discharged again via line 154 into the bottom of the desorber where it flashes partly into a hot vapor which then passes up through the descending MEA absorbent solution. H₂S, CO₂ and any other acid gases absorbed or held in the absorbent solution in loose chemical association are freed from the absorbent solution. The gases stripped from the solution finally pass from the top of the desorption column via foul gas line 156.

Line 158 leads from the bottom of the desorber 146 via pump 160 to heat exchanger 142 where some of the heat of the hot solution is transferred to the cooler solution passing through line 140 from the absorption column to the desorption column. The cooled, regenerated MEA solution then passes through a heat exchanger or cooling device 162 before passing through line 126 into the top of absorption columns 118 and 120 as described previously.

If the H₂S and CO₂ containing industrial gas stream is flowing at or near the maximum rate for which the total absorption volume of the absorption system was designed, the rich absorbent solution absorbs a concentration of H₂S which is within an acceptable range and upon desorption affords a H₂S:CO₂ concentration ratio in the foul gas stream from the desorption column that permits the subsequent Claus reactor to operate efficiently. A significant decrease in the flow rate of the gas stream will cause the rich absorbent solution to contain an unacceptable H₂S concentration with respect to the CO₂ concentration due to an increased residence time within the total absorption volume. Accordingly, the stripping of this rich absorbent solution will yield a foul gas having such a low H₂S:CO₂ concentration ratio that the CO₂ content interferes with the combustion of the gases in the Claus process. Therefore, the residence time must be decreased by having a smaller effective gas-liquid contact volume.

In FIG. 3 the smaller effective absorption volume may be achieved by closing valve 128a and opening valve 128b so that the MEA absorbent solution flowing through line 126 is conducted via line 126b into liquid distributor 130b above individual absorption volume B. Individual absorption volume A in column 118 is effectively bypassed with gas-liquid contact now occurring in individual absorption volume B and the total absorption capacity of column 120. Simultaneously with the opening and closing of liquid valves 128a and 128b, respectively, gas valve 112 is adjusted to apportion the feed gas stream between columns 118 and 120 in proportion to their effective absorption capacities. The resulting rich MEA solution will yield a foul gas stream from the desorber in which the H₂S:CO₂ concentration ratio is compatible with the smooth operation of the Claus plant. Alternatively, individual absorption volume C in column 120 could have been bypassed. With a continued decrease in the gas flow rate, or for that matter, any variation in the flow rate, various combinations of the individual absorption volumes A, B, C and D or individual absorption volumes B or D themselves may be utilized to provide the most efficient effective absorption capacity for the particular gas flow rate as described hereinbefore.

The H₂S and CO₂ containing foul gas from the desorber 146 passes through line 156 to a burner 164 where the H₂S and other combustible gases in the foul gas are oxidized by oxygen or air which enters burner 164 through line 166. Associated with burner 164 is a thermal reactor 168 and a boiler 170 which makes use of the heat of combustion and also the heat of reaction of the H₂S and SO₂ in the thermal reactor 168 to form steam from boiler feed water which enters boiler 170 through line 172. Steam from the boiler exits through line 174. The function of thermal reactor 168 in the system is essentially to allow sufficient residence time for the reaction gases to reach their thermodynamic equilibrium point and to thoroughly intermix.

The amount of oxygen or air admitted to burner 164 is an amount sufficient to oxidize one-third of the H₂S in the foul gas so that the ratio of H₂S:SO₂ in the oxidized gas is 2:1, the stoichiometric ratio for the reversible reaction of H₂S and SO₂ to produce elemental sulfur according to the chemical equation $$2H_2S + SO_2 \rightleftharpoons 3S + 2H_2O.$$

Some of the SO₂ immediately reacts with the H₂S in thermal reactor 168 to form elemental sulfur. This sulfur is entrained as sulfur vapor in the hot gas which leaves the thermal reactor. The hot gases and entrained sulfur vapor are passed through line 176 to a heat exchanger or cooling coil 178 where the gases are cooled sufficiently to condense the sulfur vapor to molten sulfur which is then collected in sulfur collecting tank 180 as the cooled gases pass through the upper portion of the tank and out through line 182 to heat exchanger 184. In the heat exchanger the gases are reheated before being passed into a catalytic reactor 186 where the previously unreacted $H_2S$ and $SO_2$ are reacted together to form elemental sulfur and water. The gas passes from the catalytic reactor 186 through line 188 to heat exchanger 184 where it gives up some of its heat of reaction to the gas entering the reactor. The partially cooled gas then passes through cooling coil or condenser 190 where the elemental sulfur vapor is condensed to molten sulfur which is collected in the bottom of sulfur collecting tank 192. The molten sulfur collected in the two sulfur recovery tanks 180 and 192 is removed, usually periodically, from these tanks through line 194 which leads to sulfur storage or use facilities, not shown.

The tail gas from catalytic reactor 186 passes via the collector tank 192 through line 196 to equipment for further treatment as is common in the art such as additional catalytic reactors, incineration and discharge to the atmosphere, oxidation and recycling of the $SO_2$ to the Claus reactor, or reduction and recycling of the $H_2S$ to the Claus reactor or the absorption columns.

The aqueous alkanolamine solutions absorb $H_2S$ much faster than $CO_2$ because $H_2S$ is a weak acid which will immediately react with the basic alkanolamine solution whereas $CO_2$ must first chemically equilibrate with the aqueous solvent to form the weak acid $H_2CO_3$ which then can react with the basic alkanolamine solution. Accordingly, this absorption rate difference between $H_2S$ and $CO_2$ should exist with any basic absorbent solution which could then be used in the practice of this invention.

Included in the inventive concept of bypassing or eliminating an individual absorption volume from the total absorption volume by redirecting the passage of the absorbent solution streams is the situation in which the absorbent solution still passes through the eliminated individual absorption volume at such a reduced flow rate that minimum or insignificant gas-liquid contact occurs. This is to say that while some absorption may occur in the eliminated individual absorption volume, it is eliminated or bypassed in relation to the degree of absorption which occurs in the remaining individual absorption volumes composing the total absorption column.

In conjunction with the determining of the passage of the absorbent solution through a total absorption volume to afford a lesser residence time for the gas stream by using a smaller effective absorption capacity, a fine control over the ratio of absorbed gaseous components can be effected by a limited control of the absorbent flow rate in addition to particular sizing of the individual absorption volumes.

We claim:

1. A method for maintaining operative a Claus-type sulfur recovery system which recovers sulfur removed as $H_2S$ from an $H_2S$ and $CO_2$ containing industrial gas stream having a variable flow rate comprising
   (a) passing an $H_2S$ and $CO_2$ containing industrial gas stream through an absorption apparatus having a total absorption capacity dimensioned to treat the maximum gas flow, which absorption apparatus includes two absorption columns connected in parallel, each absorption column comprising at least two individual absorption sections connected in series,
   (b) contacting the industrial gas stream with a basic absorbent solution that absorbs $H_2S$ and $CO_2$ at different rates in the total absorption capacity of the absorption apparatus to afford a desulfurized gas stream and to produce a loaded absorbent solution,
   (c) regenerating the loaded absorbent solution in a desorption apparatus to desorb the $H_2S$ and $CO_2$ to yield a foul gas stream,
   (d) reacting the foul gas stream in a Claus-type sulfur recovery system to form elemental sulfur,
   (e) directing the passage of the basic absorbent solution through the absorption apparatus to bypass an individual absorption section and to eliminate said individual absorption section from the effective gas-liquid contacting process as the flow rate of the industrial gas stream decreases and before the flow rate falls to that rate at which the Claus-type sulfur recovery system becomes inoperative to afford a desulfurized gas stream and to produce a loaded absorbent solution, and
   (f) repeating steps (c) and (d).

2. The method of claim 1 in which the absorption columns are of equal effective absorption capacities.

3. The method of claim 1 in which the absorption columns are of unequal effective absorption capacities.

4. The method of claim 1 in which the individual absorption sections of an absorption column are of equal effective absorption capacities.

5. The method of claim 1 in which the individual absorption sections of an absorption column are of unequal effective absorption capacities.

6. The method of claim 1 in which the basic absorbent solution is a monoethanolamine solution.

* * * * *

UNITED STATES PATENT AND TRADEMARK OFFICE
CERTIFICATE OF CORRECTION

PATENT NO. : 4,198,387
DATED : April 15, 1980
INVENTOR(S) : Joseph A. Laslo and John K. Laberteaux It is certified that error appears in the above-identified patent and that said Letters Patent are hereby corrected as shown below:

Col. 8, line 52, "A + 30" should read --A = 30--.

Col. 9, Table I, the footnote:

"A = +  B = °
 C = °  D = +"  should read   --A = 30  B = 20  C = 20  D = 30--

Signed and Sealed this

Twenty-ninth Day of July 1980

[SEAL]

Attest:

SIDNEY A. DIAMOND

Attesting Officer      Commissioner of Patents and Trademarks